United States Patent
Lee et al.

(10) Patent No.: US 8,669,709 B2
(45) Date of Patent: Mar. 11, 2014

(54) SOLID STATE LIGHTING DRIVER WITH THDI BYPASS CIRCUIT

(75) Inventors: George Lee, Rowland Heights, CA (US); Arthur Young, Walnut, CA (US); Jing-Bo Mo, La Mirada, CA (US)

(73) Assignee: American Bright Lighting, Inc., Chino, CA (US)

( * ) Notice: Subject to any disclaimer, the term of this patent is extended or adjusted under 35 U.S.C. 154(b) by 323 days.

(21) Appl. No.: 13/216,763

(22) Filed: Aug. 24, 2011

(65) Prior Publication Data

US 2012/0049742 A1   Mar. 1, 2012

Related U.S. Application Data

(60) Provisional application No. 61/377,846, filed on Aug. 27, 2010.

(51) Int. Cl.
*H05B 37/02* (2006.01)
(52) U.S. Cl.
USPC .................. 315/185 R; 315/193; 315/307
(58) Field of Classification Search
USPC ............. 315/185 R, 193, 186, 192, 291, 307, 315/308, 246, 247
See application file for complete search history.

(56) References Cited

U.S. PATENT DOCUMENTS

| | | | |
|---|---|---|---|
| 5,661,645 A | 8/1997 | Hochstein | |
| 5,936,599 A | 8/1999 | Reymond | |
| 6,283,612 B1 | 9/2001 | Hunter | |
| 6,536,924 B2 | 3/2003 | Segretto | |
| 6,726,341 B2 | 4/2004 | Pashley et al. | |
| 6,758,573 B1 | 7/2004 | Thomas et al. | |
| 6,989,807 B2 | 1/2006 | Chiang | |
| 7,318,661 B2 | 1/2008 | Catalano | |
| 7,378,805 B2 | 5/2008 | Oh et al. | |
| 8,258,706 B2 * | 9/2012 | Maruyama et al. | ........... 315/119 |
| 2002/0158590 A1 | 10/2002 | Saito | |
| 2003/0112627 A1 | 6/2003 | Deese | |
| 2003/0189829 A1 | 10/2003 | Shimizu et al. | |
| 2005/0068770 A1 | 3/2005 | Sloan et al. | |
| 2005/0156536 A1 | 7/2005 | Ball | |
| 2006/0082330 A1 | 4/2006 | Montante | |

(Continued)

FOREIGN PATENT DOCUMENTS

| | | |
|---|---|---|
| CN | 1722927 A | 1/2006 |
| DE | 4202776 A1 | 8/1993 |

(Continued)

OTHER PUBLICATIONS

European Office Action dated Feb. 1, 2012 for European Patent Application No. 08742465.1, filed on Oct. 7, 2009.

(Continued)

*Primary Examiner* — David H Vu
(74) *Attorney, Agent, or Firm* — Vic Y. Lin; Innovation Capital Law Group, LLP

(57) ABSTRACT

A solid state lighting driver and system having a total harmonic distortion ("THDi") bypass circuit is disclosed. The solid state driver energizes a solid state lamp having a first lighting segment serially connected to a second lighting segment. The THDi bypass circuit bypasses a first lighting segment and energizes a second lighting segment of LEDs when the driving voltage is low. As a result, the solid state lamp will emit light over a larger portion of the power cycle and will decrease the THDi.

18 Claims, 7 Drawing Sheets

(56) References Cited

U.S. PATENT DOCUMENTS

| | | | |
|---|---|---|---|
| 2006/0083038 A1 | 4/2006 | Lynch | |
| 2006/0192728 A1 | 8/2006 | Kim | |
| 2006/0284728 A1 | 12/2006 | Rubenstein et al. | |
| 2007/0030678 A1 | 2/2007 | Bedson et al. | |
| 2007/0158668 A1 | 7/2007 | Tarsa et al. | |
| 2007/0188112 A1 | 8/2007 | Kang et al. | |
| 2010/0002432 A1 | 1/2010 | Romano | |
| 2010/0045198 A1 | 2/2010 | Lee et al. | |
| 2010/0195322 A1 | 8/2010 | Kawakami et al. | |
| 2010/0231132 A1* | 9/2010 | Logiudice et al. | 315/161 |

FOREIGN PATENT DOCUMENTS

| | | |
|---|---|---|
| FR | 2891106 A1 | 3/2007 |
| JP | 0003094666 | 4/2003 |
| JP | 2004-093657 | 3/2004 |

OTHER PUBLICATIONS

Office Action (Mailing Date Feb. 8, 2013) for China Patent Application No. 200980132312.5, filed on Feb. 21, 2011.

Office Action (Mailing Date Jan. 29, 2013) for China Patent Application No. 200880012985.2, filed on Oct. 22, 2009.

Notification of the Transmittal of the International Search Report and The Written Opinion of the International Searching Authority, International Search Report (date mailed Jul. 29, 2009) and Written Opinion of the International Searching Authority for PCT/US08/04255, filed on Apr. 1, 2008.

Notification of the Transmittal of the International Search Report and The Written Opinion of the International Searching Authority, International Search Report (date mailed Oct. 20, 2009) and Written Opinion of the International Searching Authority for PCT/US09/054642, filed on Aug. 21, 2009.

Notification of the Transmittal of the International Search Report and The Written Opinion of the International Searching Authority, International Search Report (date mailed Dec. 15, 2011) and Written Opinion of the International Searching Authority for PCT/US11/048952, filed on Aug. 24, 2011.

USPTO Office Action Dated Oct. 6, 2011 for U.S. Appl. No. 13/153,957, filed Jun. 6, 2011.

USPTO Office Action Dated Jan. 23, 2009 for U.S. Appl. No. 11/890,718, filed Aug. 7, 2007.

USPTO Office Action Dated Nov. 16, 2009 for U.S. Appl. No. 11/890,718, filed Aug. 7, 2007.

USPTO Office Action Dated Feb. 17, 2010 for U.S. Appl. No. 11/890,718, filed Aug. 7, 2007.

USPTO Office Action Dated Dec. 27, 2011 for U.S. Appl. No. 12/545,613, filed Aug. 21, 2009.

European Search Report dated Jan. 20, 2012 for European Patent Application No. 08742465.1, filed on Oct. 7, 2009.

U.S. Office Action dated Apr. 13, 2012 for U.S. Appl. No. 12/545,613, filed Aug. 21, 2009.

* cited by examiner

SOLID STATE LIGHTING DRIVER WITH THDI BYPASS CIRCUIT

RELATED APPLICATION INFORMATION

The present application claims priority under 35 U.S.C. Section 119(e) to U.S. Provisional Patent Application Ser. No. 61/377,846 filed Aug. 27, 2010, the disclosure of which is incorporated herein by reference in its entirety.

BACKGROUND OF THE INVENTION

1. Field of the Invention

The present invention relates in general to solid state lighting drivers and lighting systems. More particularly, the invention is directed to LED lighting systems.

2. Description of the Related Art

Solid state lighting apparatuses are becoming increasingly more common as they offer higher efficiencies and longer lifetimes as compared to conventional light sources such as incandescent lamps. However, the drivers which energize the solid state lighting devices exhibit substantially shorter lifetimes as compared to the solid state lighting devices, and often have excessive total harmonic distortion.

Accordingly, a need exists to improve the solid state lighting drivers and systems.

SUMMARY OF THE INVENTION

In a first aspect, a lighting driving circuit comprising a current driving circuit and a bypass circuit is provided. The current driving circuit is coupled to an alternating current (AC) power source having a power cycle, and the driving circuit configured for providing electrical current to a solid state lamp having a first lighting segment and a second lighting segment. The driving circuit is configured for coupling directly to the input of the first lighting segment and the input of the second lighting segment is coupled directly to the output of the first lighting segment. The bypass circuit is coupled to the current driving circuit and the configured for coupling to the input of the second lighting segment, where the bypass circuit is configured for providing a bypass current from the driving circuit to the second lighting segment during time periods within the power cycle.

In a first preferred embodiment of the lighting driving circuit, the first lighting segment preferably comprises a first plurality of light emitting diodes (LEDs) connected in series, and the second lighting segment preferably comprises a second plurality of LEDs connected in series. The bypass circuit preferably provides the bypass current from the driving circuit to the second lighting segment based on the voltage of the input of the second lighting segment. The bypass circuit is preferably further configured for terminating bypass current flow from the driving circuit when the voltage of the input of the second lighting segment exceeds a threshold value. The bypass circuit preferably further comprises a metal oxide semiconductor field effect transistor (MOSFET) having a drain and source electrically coupled to the driving circuit and the input of the second lighting segment. The gate of the MOSFET is preferably coupled to the input of the second lighting segment. The total harmonic distortion of current (THDi) is preferably less than 15%. The power factor of the driving circuit preferably exceeds 95%. The AC power source preferably comprises a 120 Volt source. The AC power source preferably comprises a 240 Volt source.

In a second aspect, a lighting system comprising a solid state lamp, a current driving circuit, and a bypass circuit is provided. The solid state lamp has a first lighting segment and a second lighting segment, where the input of the second lighting segment is coupled to the output of the first lighting segment. The current driving circuit is coupled to an alternating current (AC) power source having a power cycle and the current driving circuit is configured for providing electrical current to a solid state lamp. The driving circuit is coupled to the input of the first lighting segment. The bypass circuit is coupled to the current driving circuit and the input of the second lighting segment. The bypass circuit is configured for providing a bypass current from the driving circuit to the second lighting segment during time periods within the power cycle.

In a second preferred embodiment, the first lighting segment preferably comprises a first plurality of light emitting diodes (LEDs) connected in series and, the second lighting segment preferably comprises a second plurality of LEDs connected in series. The bypass circuit preferably provides the bypass current from the driving circuit to the second lighting segment based on the voltage of the input of the second lighting segment. The bypass circuit is preferably further configured for terminating bypass current flow from the driving circuit when the voltage of the input of the second lighting segment exceeds a threshold value. The bypass circuit preferably further comprises a metal oxide semiconductor field effect transistor (MOSFET) having a drain and source electrically coupled to the driving circuit and the input of the second lighting segment. The gate of the MOSFET is preferably coupled to the input of the second lighting segment. The total harmonic distortion of current (THDi) is preferably less than 15%.

In a third aspect, a method for generating light is provided. The method comprises providing alternate current (AC) having power cycles, rectifying the alternate current to form a full-wave rectification signal, generating a drive current based on the full-wave rectification signal, energizing a solid state lamp having a first lighting segment and a second lighting segment coupled to the first lighting segment, bypassing current from the drive current during an energizing time period to the second lighting segment, and generating light from the second lighting segment from the bypassed current.

In a third preferred embodiment, the method preferably further comprises
 terminating the bypass current based on a voltage, and generating light from the first lighting segment and the second lighting segment from the drive current. Terminating the bypass current is preferably based on the voltage of the input of the second lighting segment.

These and other features and advantages of the invention will become more apparent with a description of preferred embodiments in reference to the associated drawings.

DETAILED DESCRIPTION OF THE PREFERRED EMBODIMENTS

The following preferred embodiments are directed to solid state lighting drivers and systems. Solid state lighting devices such as light emitting diodes ("LEDs") exhibit substantially greater power efficiencies and operating lifetimes as compared with conventional light sources such as incandescent lamps. However, several challenges exist for retro-fitting LEDs into existing light fixtures which typically provide 120 volts ("V") of alternating current ("AC"). LEDs emit light only when operated in a forward biased configuration and have a forward voltage drop in the range of 1.9 V to 3.2 V depending on emission wavelength of the LEDs. LEDs may be connected in series to form a LED string having an overall voltage drop closer to the maximum voltage for a 120 VAC source. However, the LEDs will emit light only during a portion of the power cycle and will exhibit reduced power efficiencies and larger total harmonic distortion ("THDi").

In an embodiment, the THDi is reduced as a result of a THDi bypass circuit which bypasses a first lighting segment of the LEDs and energizes a second lighting segment of LEDs when the driving voltage is low. When the voltage across the first lighting segment of LEDS reaches a threshold, the THDi bypass circuit terminates the flow of the bypassing current to the second lighting segment of LEDs and the driver circuit powers the entire chain of LEDS. As a result, the LED string will emit light over a larger portion of the power cycle and will decrease the THDi.

Most conventional approaches for driving LEDs employ drive circuitry which converts AC line voltage to a low DC voltage by using an external LED driver such as a switch mode power supply or using a passive, resistive approach. Embodiments provide an active simple direct high voltage or offline LED solution employing a limited number of components. Moreover, embodiments provide superior performance for enhanced power factors, stabilized drive current with varying voltage, and reduced THDi. Furthermore, embodiments exhibit an enhanced operational lifetime compared to conventional approaches which rely on electrolytic capacitors which typically fail before the LEDs. Embodiments employ only a ceramic capacitor that is capable of long operating lifetime unlike typical electrolytic capacitors used in conventional LED drivers. Embodiments provide an active, simple, low cost, effective offline driving solution that overcomes the disadvantages of conventional LED drivers.

Teachings related to solid state lighting systems and drivers include the disclosures provided by U.S. Publication Numbers 2008/0265801 and 2010/0045198, both to Lee et al. which are incorporated by reference as though fully set forth herein.

Figure 1:
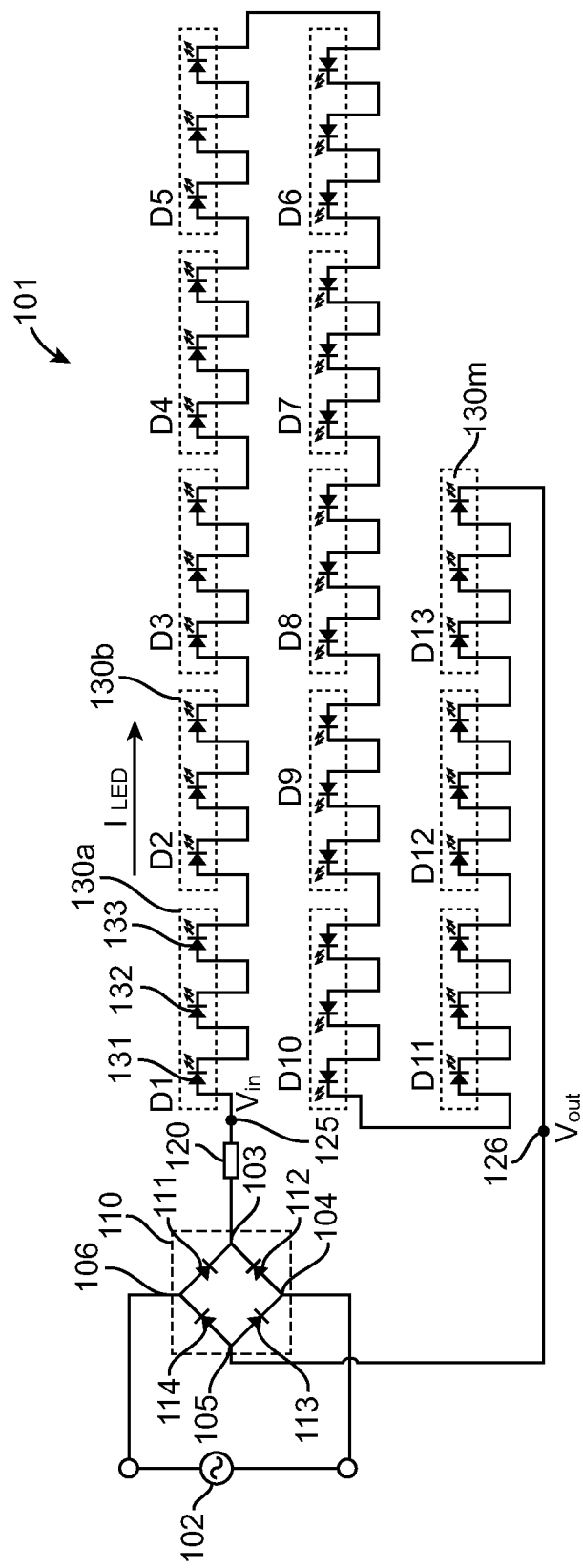
FIG. 1 shows a functional block diagram of a lighting assembly having multiple LEDs serially connected.

FIG. 1 shows a functional block diagram of a lighting assembly 101 having multiple LEDs serially connected. AC power source 102 is electrically connected to bridge rectifier 110 via pins 106 and 104. The bridge rectifier 110 comprises diodes 111, 112, 113, and 114. The bridge rectifier 110 rectifies the AC line voltage and provides a full-wave rectification signal at output 103. The output 103 of the bridge rectifier 110 is connected to a current limiting device 120. The current limiting device 120 may be a current driving circuit as discussed below. The current limiting device 120 is coupled to serially-connected LED modules 130a-130m. Each LED module such as LED module 130a has three serially connected LEDs 131, 132, and 133. Hence, there are 13 LED modules or 39 LEDs connected in series. The output of the last LED module 130m is connected to the bridge rectifier 110 though pin 105.

Figure 2:
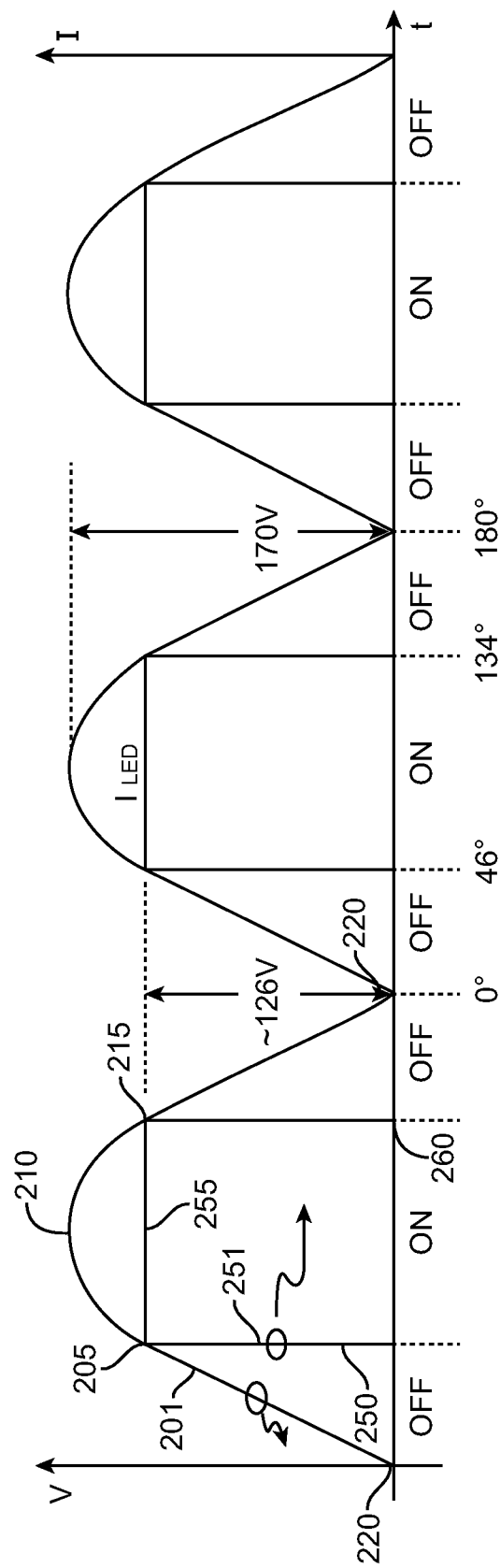
FIG. 2 shows an exemplary graph of the voltage and the current for the lighting assembly depicted in FIG. 1.

FIG. 2 shows an exemplary graph of the voltage 201 and the current 251 for the lighting assembly depicted in FIG. 1. The voltage 201 is the difference between the voltage at the output 125 of current limiter 120 and output 126 of the LED module 130m which are depicted as $V_{in}$ and $V_{out}$ on FIG. 1. The current 251 is the current flowing through the LED modules 130a through 130m. The voltage 201 exhibits a full-wave rectified pattern as a result of the bridge rectifier 110 and varies as an absolute value of a sine wave. The voltage 201 varies from 0 V at point 220 and increases to a maximum of approximately 170 V at point 210 for a typical 120 Volt service line.

LEDs have a forward voltage $V_f$ ranging from approximately 1.9 V for infrared LEDs to approximately 3.2 V for white or blue LEDS. LEDs exhibit minimal leakage currents when driven below forward voltage $V_f$. However, the drive current increases dramatically when the LEDs are driven beyond the forward voltage $V_f$. FIG. 2 depicts an exemplary graph for an embodiment having 39 LEDs each having a forward voltage $V_f$ of 3.2 V. Hence, the current 251 abruptly increases at point 205 where the potential of the LED modules 130a through 130m reaches the product of 3.2 V per LED over 39 LEDs for a total voltage drop of approximately 126 V. The current 251 remains constant in the upper region 255 as a result of the current limiter 120. Once the potential drops below 126 V, the current 251 falls to near zero at point 260.

Lighting assembly 101 exhibits good power factors but suffers from a high THDi. Many utility companies offer rebates for lighting devices having low a THDi. Hence, a THDi bypass circuit was designed to lower the THDi below the required 20% level.

Figure 3:
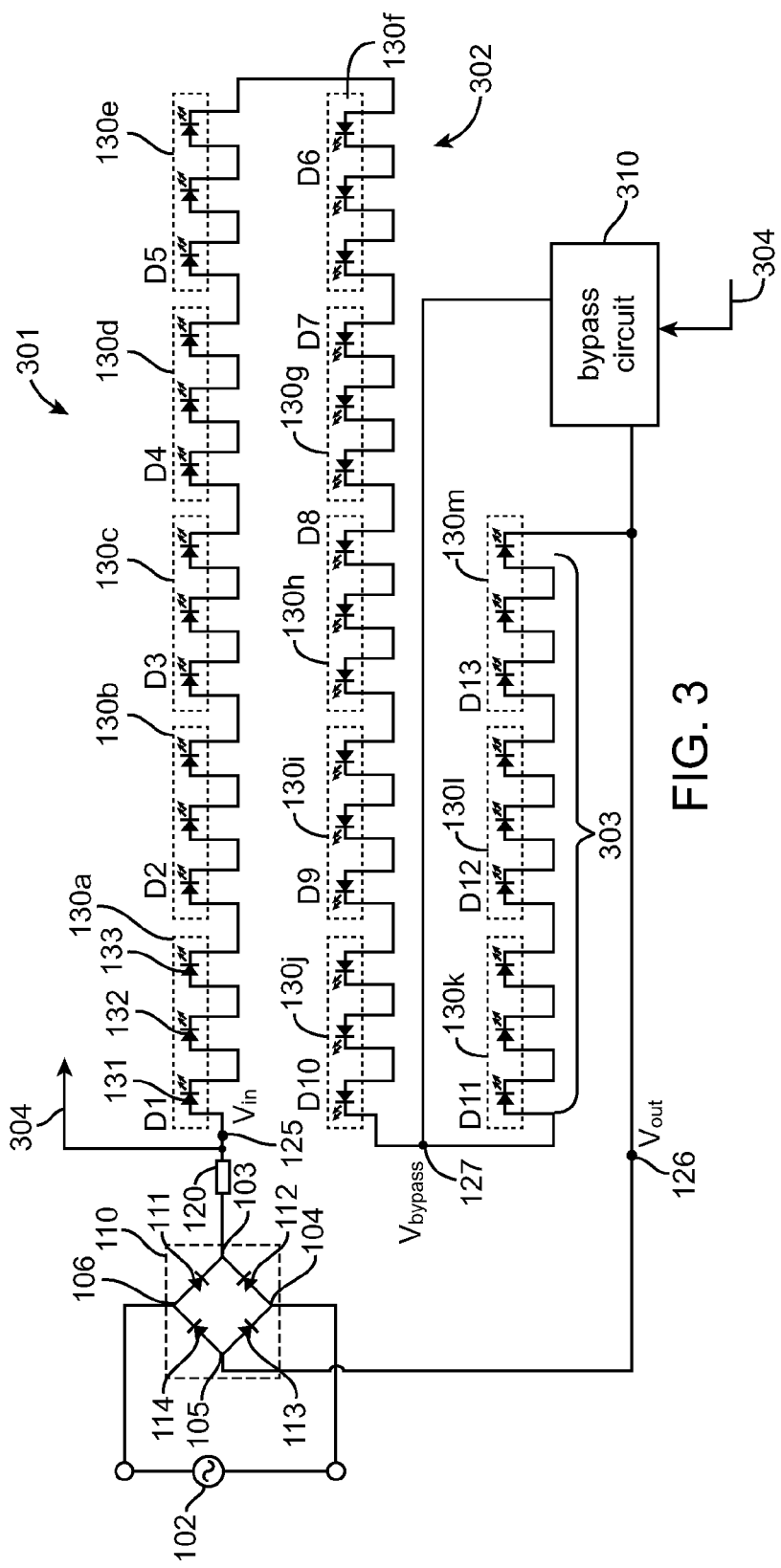
FIG. 3 shows a functional block diagram of a lighting assembly having an exemplary bypass circuit in parallel with a lighting segment of LEDs.

FIG. 3 shows a functional block diagram of a lighting assembly 301 having an exemplary THDi bypass circuit 310. The lighting assembly 301 has a first lighting segment 302 comprising serially-connected LED modules 130a through 130j and a second lighting segment 303 comprising serially-connected LED modules 130k through 130m. The input of the second lighting segment 303 is connected directly to the output of the first lighting segment 302 at point 127. Lighting assembly 301 has a bridge rectifier 110 and a current limiter 120. The bypass circuit 310 is fed by the output of the current limiter 120 through line 304. The bypass circuit 310 is also connected to the output 127 of the first lighting segment 302, and to the output 126 of the second lighting segment 303. The bypass circuit 310 provides a bypass current to the input of a second lighting segment 303 at point 127. The bypass circuit 310 is configured for energizing some of the LEDs sufficiently to cause some of the LEDs to illuminate but at lower voltage and lower current levels.

Figure 4:
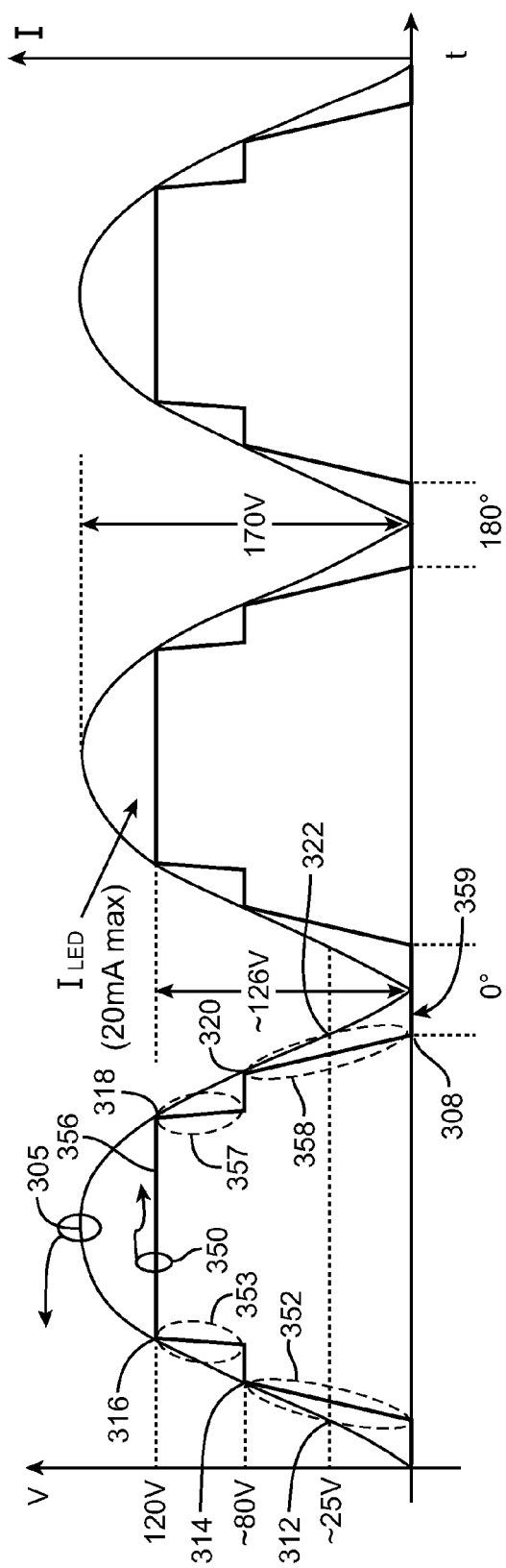
FIG. 4 shows an exemplary graph of the voltage plot and current plot for the light assembly depicted in FIG. 3.

FIG. 4 shows an exemplary graph of the voltage 305 and current 350 for the light assembly 301 depicted in FIG. 3. The voltage 305 is the difference in potential between the voltage at the output 125 of current limiter 120 and output 126 of the LED module 130m which are depicted as $V_{in}$ and $V_{out}$ on FIG. 3. The current 350 is the current flowing from current limiter 120 and is limited to a maximum drive current such as for example 20 milliamperes ("mA") by the current limiter 120. While the maximum current level is approximately 20 mA in this non-limiting example, it shall be understood that other maximum current levels may be employed.

As the voltage 305 increases from 0 V and reaches ~25 V at point 312, the bypass circuit 310 is configured to bypass a portion of the drive current to the output 127 so that LEDs in the second lighting segment 303 (i.e. LED modules 130*k* through 130*m*) may illuminate with current depicted by the range 352 of the current plot. Once the voltage 305 reaches a voltage of approximately 80 V at point 314, the bypass circuit stops conducting the bypass current because voltage $V_{bypass}$ is sufficiently high as a result of the current flowing through the first lighting segment 302. As the voltage rises above approximately 80 V, the current 350 rises as depicted by range 353 of the current plot. As the voltage 305 reaches approximately 126 V at point 316, both the first and second lighting segments 302 and 303 will illuminate with a constant current level 356 which is limited to approximately 20 mA by the current limiter 120 for example. When the voltage 305 falls below approximately 126 V at point 318, the current falls as depicted by range 357 of the current plot. When the voltage 305 falls below approximately 80 V at point 320, the current 350 falls as depicted by range 358 of the current plot. When the voltage 305 falls below approximately 25 V at point 322, the current flow is terminated at current level 359.

Figure 5:
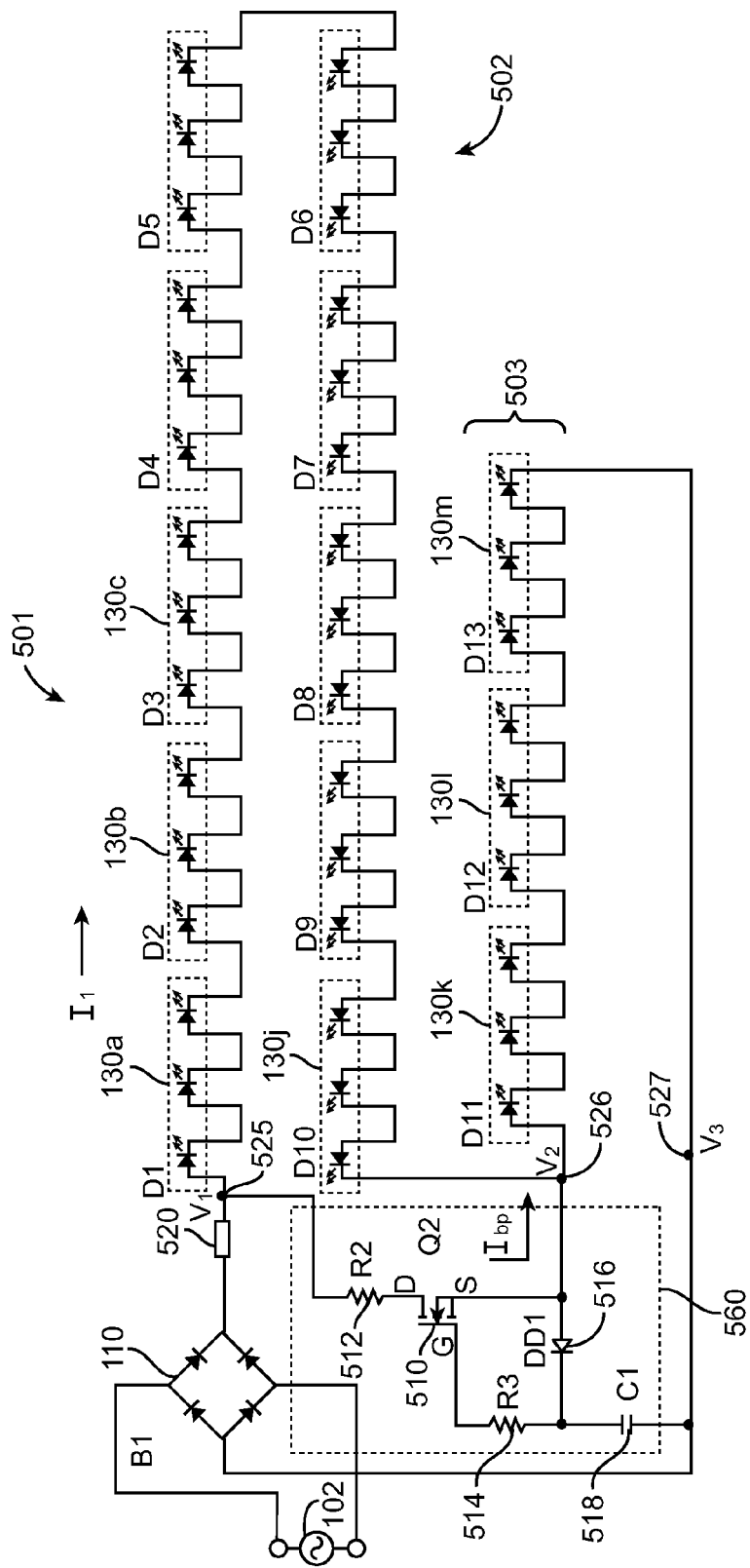
FIG. 5 shows a functional block diagram of an embodiment of a lighting assembly having an exemplary bypass circuit.

FIG. 5 shows a functional block diagram of an embodiment of a lighting assembly 501 having an exemplary THDi bypass circuit 560, where the lighting assembly 501 is configured for 120 Volt applications. The lighting assembly 501 comprises a current driving circuit 520 and a bypass circuit 560. The lighting assembly further comprises a first lighting segment 502 comprising serially connected LED modules 130*a* through 130*j* and a second lighting segment 503 comprising LED modules 130*k* through 130*m*. The bypass circuit is configured for energizing the second lighting segment 503 comprising LED modules 130*k* through 130*m* during periods within the power cycle. The output of the first lighting segment 502 is connected to the input of the second lighting segment 503 at point 526. While FIG. 5 depicts a string of LEDs in this non limiting example, it shall be understood that other types of solid state lamps having a first lighting segment and a second segment, where the input of the second segment is coupled to the output of the first segment is contemplated by one or more embodiments.

The current driving circuit 520 is coupled to an alternating current (AC) power source 102 having a power cycle. The driving circuit 520 provides an electrical current $I_1$ to the first and second lighting segments 502 and 503 and is electrically connected directly to the input of the first lighting segment 502. The driving circuit 520 may be a current limiter or a current source as discussed below with respect to driving circuit 620 depicted in FIG. 6 and discussed below.

Bypass circuit 560 is electrically connected to the output of the current driving circuit 520 and the input of the second lighting segment 503. The bypass circuit provides a bypass current $I_{bp}$ from the driving circuit to the second lighting segment during energizing time periods within the power cycle. The bypass circuit 560 may provide the bypass current from the driving circuit to the second lighting segment 503 based on the voltage $V_2$ of the input of the second lighting segment at point 526.

The bypass circuit may be composed of an N channel enhancement mode MOSFET 510 used in conjunction with resistors 512 and 514, a ceramic capacitor 518, and a diode 516. The circuit has a tap point 526 which connects within a string of LEDs to energize a designated number of LEDs.

In an embodiment, bypass circuit 560 comprises a resistor 512 (R2) connected to the output of the current driving circuit 520 and to the drain of an enhanced MOSFET 510 (Q2). The source of the MOSFET 510 is connected to the input of second lighting segment 503. The gate of the MOSFET 510 is connected to resistor R3 which is connected to capacitor 518 (C1) and diode 516 (DD1). The capacitor 518 is connected to the output of the second lighting segment 503 and the diode 516 is connected to the input of the second lighting segment 503. In an embodiment, the MOSFET 510 may be 250V N-channel enhanced mode MOSFET such as the ZVN4525E6 manufactured by Zetex for example, and resistors 512 and 514 are 4.7K Ohm resistors, and capacitor 518 may be a 0.01 µF/100V capacitor.

Figure 6:
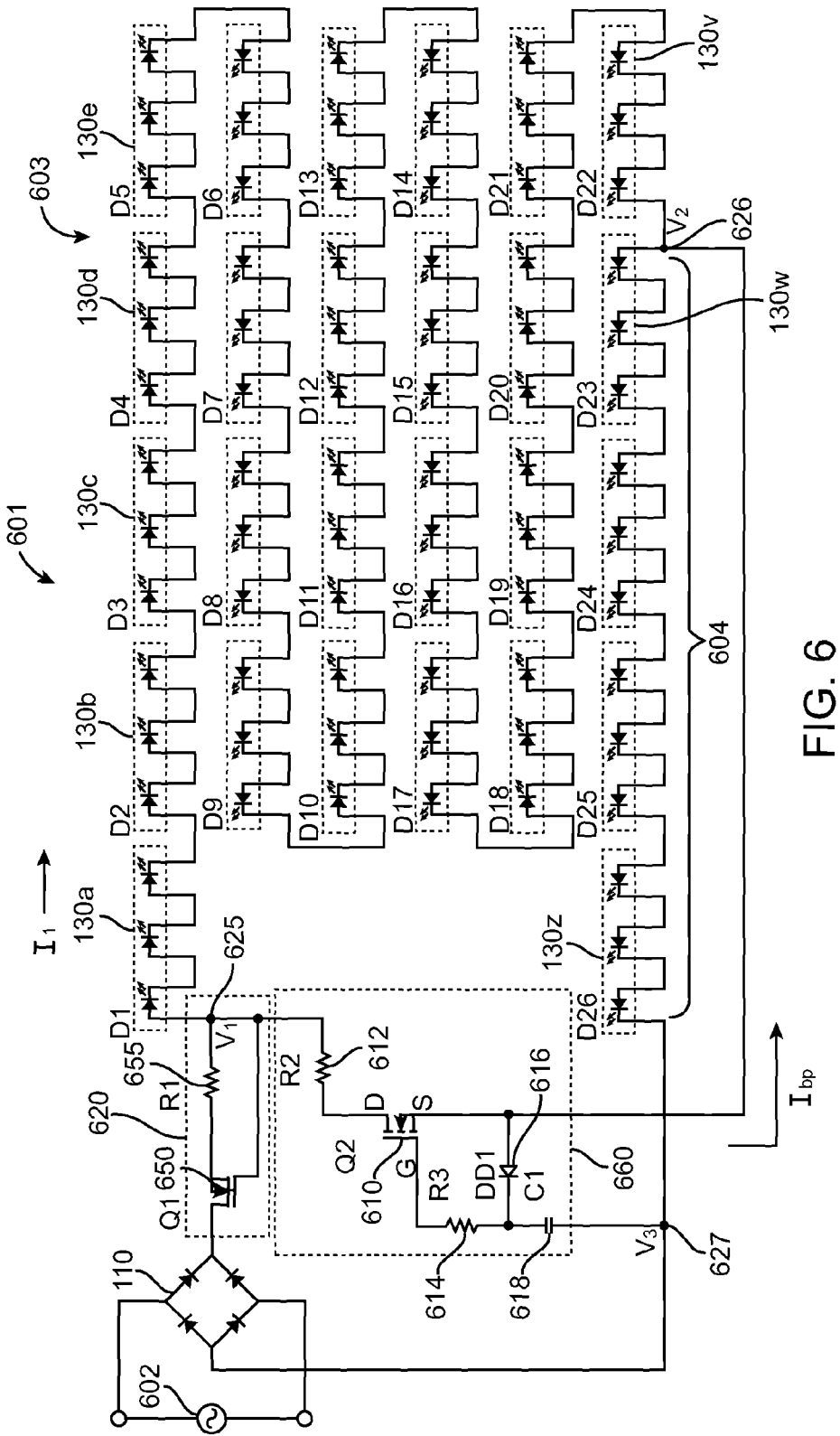
FIG. 6 shows a functional block diagram of another embodiment of a light assembly having an exemplary bypass circuit.

Similarly, FIG. 6 shows a functional block diagram of an embodiment of a lighting assembly 601 for having an exemplary bypass circuit 660, where the lighting assembly 601 is configured for 240 Volt applications. The lighting assembly 601 comprises a current driving circuit 620 and a bypass circuit 660. The lighting assembly further comprises a first lighting segment 603 comprising serially connected LED modules 130*a* through 130*v* and a second lighting segment 604 comprising LED modules 130*w* through 130*z*. The bypass circuit is configured for energizing the second lighting segment 604 comprising LED modules 130*w* through 130*z* during periods within the power cycle. The output of the first lighting segment 603 is connected to the input of the second lighting segment 604 at point 626.

The lighting assembly 601 comprises a current driving circuit 620 and a bypass circuit 660. The current driving circuit 620 is coupled to an alternating current (AC) power source 602 having a power cycle. The driving circuit 620 is electrically connected directly to the input of the first lighting segment 603. The current driving circuit 620 may comprise an N channel depletion mode MOSFET 650 that is used with a resistor 655 to provide a constant current. The current is controlled by the resistor 655. The MOSFET 650 and a resistor 655 are configured for providing a constant drive current over a wide range of voltages. In an embodiment, MOSFET 650 may be an N-channel depletion mode MOSFET having a high $V_{ds}$ to be used in AC operations (e.g., 350V for European applications) with a low on resistance and a high $I_{dss}$ such as the DN3135 manufactured by Supertex and resistor 655 may be a 175 Ohm resistor.

Bypass circuit 660 is electrically connected to the current driving circuit 620 and the input of the second lighting segment 604. The bypass circuit 660 provides a bypass current $I_{bp}$ from the driving circuit to the second lighting segment 604 during energizing time periods within the power cycle. In an embodiment, bypass circuit 660 comprises a resistor 612 (R2) connected to the output of the current driving circuit 620 and to the drain of an enhanced MOSFET 610 (Q2). The source of the MOSFET 610 is connected to the input of the second lighting segment 604. The gate of the MOSFET 610 is connected to resistor 614 (R3) which is connected to capacitor 618 (C1) and diode 616 (DD1). The capacitor 618 is connected to the output of the second lighting segment 604 and the diode 616 is connected to the input of the second lighting segment. In an embodiment, the MOSFET 610 may be a 250V N-channel enhancement mode MOSFET such as the ZVN4525E6 manufactured by Zetex for example, resistor 612 may be a 15 K Ohm resistor, resistor 614 may be a 4.7 K Ohm resistor, and capacitor 618 may be a 0.01 µF 200V capacitor.

Figure 7:
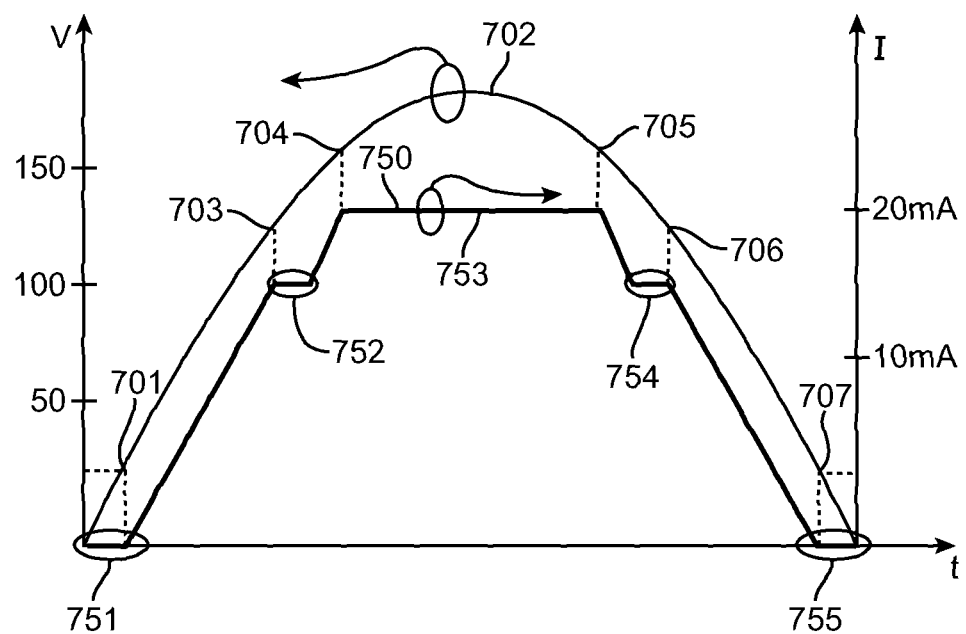
FIG. 7 shows an exemplary graph of the voltage and current for the lighting assembly depicted in FIG. 5.

FIG. 7 shows an exemplary graph of the voltage plot 702 and the current plot 750 for the lighting assembly depicted in FIG. 5 which illustrates the effects of a bypass circuit 560. As discussed above with the lighting assembly 101 depicted in FIG. 1, a circuit that does not employ a bypass circuit such as bypass circuits 560 and 660 will not significantly illuminate the LEDs until the potential reaches approximately 130V or 260 respectively. Embodiments having bypass circuits energize and cause to illuminate the lower LEDS within an LED string when the potential is less than 130V. When the voltage at 702 is between approximately 0 V and approximately 25 V at point 701, the current flow is near 0 mA as exhibited in the first flat region 751. Once the voltage 702 exceeds approximately 25 V, since capacitor 618 (C1) keeps MOSFET 610 in ready state if $V_D > V_S$, the MOSFET 610 will begin to conduct a bypass current from the drive current and will energize and cause to illuminate the second segment of the LEDs 503. When the voltage reaches approximately 100 V, the voltage at the drain of MOSFET 510 will be less than the voltage at the source of MOSFET 510 because the LEDs in the first segment 502 will begin to conduct electricity. This has the effect of switching off MOSFET 510 and terminating the flow of the bypass current as exhibited by the second flat region 752. MOSFET 510 does not conduct a bypass current while the voltage is above approximately 100 V. Hence, bypass circuit 560 is further configured to terminate bypass current flow from the driving circuit when the voltage of the current driving circuit exceeds a threshold value, which in this example is approximately 100 V. Once the voltage reaches approximately 130 V, all of the LEDs in the first lighting segment 502 and the second lighting segment 503 are fully energized with the drive current as exhibited by the third flat region 753. When the voltage drops to approximately 100 V at point 705, the MOSFET 510 begins to conduct a bypass current as exhibited by the fourth flat region 754. Once the voltage drops below approximately 25 V, no significant currents flow through the first and second lighting segments of the LEDS as exhibited by the fifth flat region 755.

One important inherent feature of the bypass circuit 560 is that the bypass current is turned on and off without using voltage detection or DC conversion. Moreover, the bypass circuit 560 comprises only 5 components which have inherently long lifetime.

The THDi can be decreased below 20% by changing resistor values according to desired circuit variables such as set driving current, input voltage, and tap in location to the LEDs. A THDi of less than 20% THDi is achievable. Embodiments may exhibit a THDi of less than 11%. Moreover, the power factor exhibited by embodiments exceed 95% and approach 99%.

More than one THDi bypass circuit may be employed to further reduce the value of the THDi. In an embodiment, lighting assemblies having multiple THDi bypass circuits operate independently. Two sets of THDi bypass circuits can reduce the value of the THDi to approximately 10%, and three sets of THDi bypass circuits can reduce the value of the THDi to less than 5%.

Although the invention has been discussed with reference to specific embodiments, it is apparent and should be understood that the concept can be otherwise embodied to achieve the advantages discussed. The preferred embodiments above have been described primarily as solid state lighting drivers and systems having a total harmonic distortion ("THDi") bypass circuits which decrease the THDi of the systems. In this regard, the foregoing description of the solid state drivers and systems are presented for purposes of illustration and description.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular applications or uses of the present invention.

What is claimed is:

1. A lighting driving circuit comprising:
a current driving circuit coupled to an alternating current (AC) line power source having a power cycle, the driving circuit configured for providing electrical current to a solid state lamp having a first lighting segment and a second lighting segment, wherein the driving circuit is configured for coupling directly to the input of the first lighting segment and the input of the second lighting segment is coupled directly to the output of the first lighting segment; and,
a bypass circuit coupled to the current driving circuit and configured for coupling to the input of the second lighting segment, wherein the bypass circuit is configured for providing a bypass current from the driving circuit to the second lighting segment during time periods within the power cycle of the AC line power source,
wherein the bypass circuit provides the bypass current from the driving circuit to the second lighting segment based on the voltage of the input of the second lighting segment.

2. The lighting driving circuit of claim 1, wherein:
the first lighting segment comprises a first plurality of light emitting diodes (LEDs) connected in series; and,
the second lighting segment comprises a second plurality of LEDs connected in series.

3. The lighting driving circuit of claim 1, wherein the bypass circuit is further configured for terminating bypass current flow from the driving circuit when the voltage of the input of the second lighting segment exceeds a threshold value.

4. The lighting driving circuit of claim 1, wherein the bypass circuit further comprises a metal oxide semiconductor field effect transistor (MOSFET) having a drain and source electrically coupled to the driving circuit and the input of the second lighting segment.

5. The lighting driving circuit of claim 4, wherein the gate of the MOSFET is coupled to the input of the second lighting segment.

6. The lighting driving circuit of claim 1, wherein the total harmonic distortion of current (THDi) is less than 15%.

7. The lighting driving circuit of claim 1, wherein the power factor of the driving circuit exceeds 95%.

8. The lighting driving circuit of claim 1, wherein the AC power source comprises a 120 Volt source.

9. The lighting driving circuit of claim 1, wherein the AC power source comprises a 240 Volt source.

10. A lighting system, comprising:
a solid state lamp having a first lighting segment and a second lighting segment, wherein the input of the second lighting segment is coupled to the output of the first lighting segment;
a current driving circuit coupled to an alternating current (AC) line power source having a power cycle, the driving circuit is configured for providing electrical current to a solid state lamp, wherein the driving circuit is coupled to the input of the first lighting segment; and,
a bypass circuit coupled to the current driving circuit and the input of the second lighting segment, wherein the bypass circuit is configured for providing a bypass current from the driving circuit to the second lighting segment during time periods within the power cycle of the AC line power source, wherein the bypass circuit provides the bypass current from the driving circuit to the second lighting segment based on the voltage of the input of the second lighting segment.

11. The lighting system of claim 10, wherein:
the first lighting segment comprises a first plurality of light emitting diodes (LEDs) connected in series; and,
the second lighting segment comprises a second plurality of LEDs connected in series.

12. The lighting system of claim 10, wherein the bypass circuit is further configured for terminating bypass current flow from the driving circuit when the voltage of the input of the second lighting segment exceeds a threshold value.

13. The lighting system of claim 10, wherein the bypass circuit further comprises a metal oxide semiconductor field effect transistor (MOSFET) having a drain and source electrically coupled to the driving circuit and the input of the second lighting segment.

14. The lighting system of claim 13, wherein the gate of the MOSFET is coupled to the input of the second lighting segment.

15. The lighting system of claim 10, wherein the total harmonic distortion of current (THDi) is less than 15%.

16. A method for generating light comprising:
providing alternate current (AC) line power source having power cycles;
rectifying the alternate current to form a full-wave rectification signal;
generating a drive current based on the full-wave rectification signal;
energizing a solid state lamp having a first lighting segment and a second lighting segment coupled to the first lighting segment;
bypassing current from the drive current during time period within the power cycle of the AC line power source to the second lighting segment, the bypassing current occurring based on a voltage of an input of the second lighting segment; and,
generating light from the second lighting segment from the bypassed current.

17. The method of claim 16, further comprising:
terminating the bypass current based on a voltage;
generating light from the first lighting segment and the second lighting segment from the drive current.

18. The method of claim 17, wherein terminating the bypass current is based on the voltage of the input of the second lighting segment.

\* \* \* \* \*